US012638880B2

(12) United States Patent (10) Patent No.: US 12,638,880 B2
Barnett et al. (45) Date of Patent: May 26, 2026

(54) DRIVE MECHANISMS FOR ACTIVATING EMERGENCY FEATURES

(71) Applicant: PopSockets LLC, Boulder, CO (US)

(72) Inventors: David Barnett, Boulder, CO (US); Thomas Meiser, Boulder, CO (US); Mike Beadle, Boulder, CO (US)

(73) Assignee: PopSockets LLC, Boulder, CO (US)

( * ) Notice: Subject to any disclaimer, the term of this patent is extended or adjusted under 35 U.S.C. 154(b) by 218 days.

(21) Appl. No.: 18/651,450

(22) Filed: Apr. 30, 2024

(65) Prior Publication Data

US 2024/0393830 A1 Nov. 28, 2024

Related U.S. Application Data

(63) Continuation-in-part of application No. 17/502,400, filed on Oct. 15, 2021, now Pat. No. 11,995,975.

(60) Provisional application No. 63/105,145, filed on Oct. 23, 2020.

(51) Int. Cl.
*G06F 1/16* (2006.01)
*A45C 11/00* (2006.01)

(52) U.S. Cl.
CPC .......... *G06F 1/1628* (2013.01); *A45C 11/002* (2025.01); *A45C 11/003* (2025.01); *G06F 1/1629* (2025.01)

(58) Field of Classification Search
CPC ... G06F 1/1628; G06F 1/1629; A45C 11/002; A45C 11/003
See application file for complete search history.

(56) References Cited

U.S. PATENT DOCUMENTS

| | | | | |
|---|---|---|---|---|
| 8,955,678 B2 * | 2/2015 | Murphy | ............... | H04B 1/3888 |
| | | | | 206/320 |
| 9,281,858 B2 * | 3/2016 | Fathollahi | ........... | H04M 1/0202 |
| 9,917,937 B1 * | 3/2018 | Fathollahi | ............ | H04B 1/3888 |
| 12,504,829 B2 * | 12/2025 | Hoover | ..................... | G06F 3/02 |
| 2013/0146491 A1 * | 6/2013 | Ghali | .................... | G06F 1/1626 |
| | | | | 53/472 |
| 2014/0239916 A1 * | 8/2014 | To | ........................ | H01H 9/0214 |
| | | | | 320/137 |
| 2025/0348110 A1 * | 11/2025 | Datta | .................... | G06F 3/0202 |

* cited by examiner

*Primary Examiner* — Nidhi Thaker
(74) *Attorney, Agent, or Firm* — Macheledt Bales LLP; Jennifer L. Bales

(57) ABSTRACT

A case includes a case body configured to equip a mobile electronic device. The case includes an actuator, and the mobile electronic device includes a physical button. The case further includes an actuator switch coupled to the case body and movable between at least a first unengaged position and a second engaged position, where the switch is connected to an engagement member. The engagement member activates a corresponding physical button of the mobile electronic device when the mobile electronic device is equipped with the case and the actuator switch is moved to the second position. The engagement member is configured to not activate the mobile electronic device button when the actuator is moved to the first position.

20 Claims, 17 Drawing Sheets

350

354

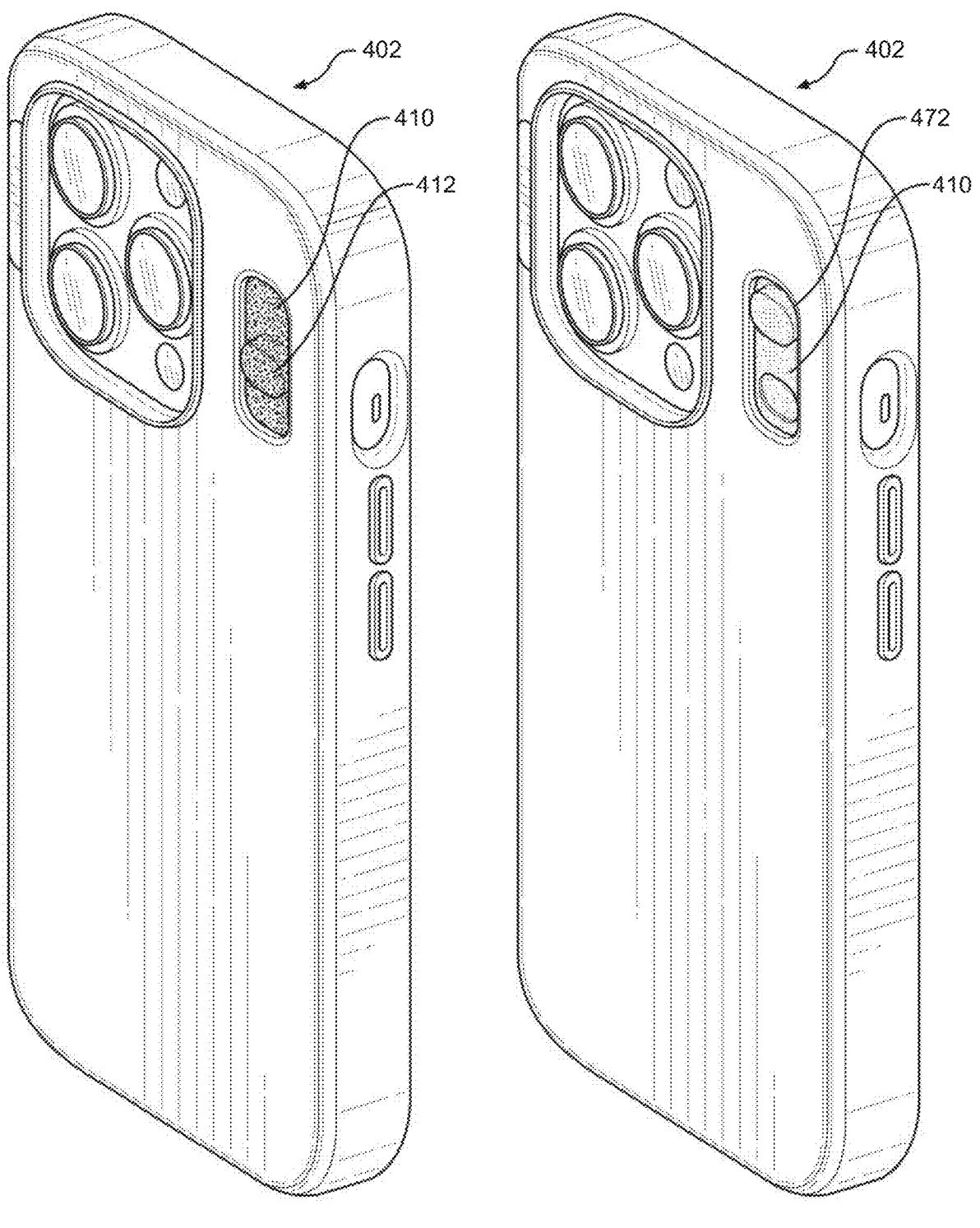
FIG. 5D                    FIG. 5E

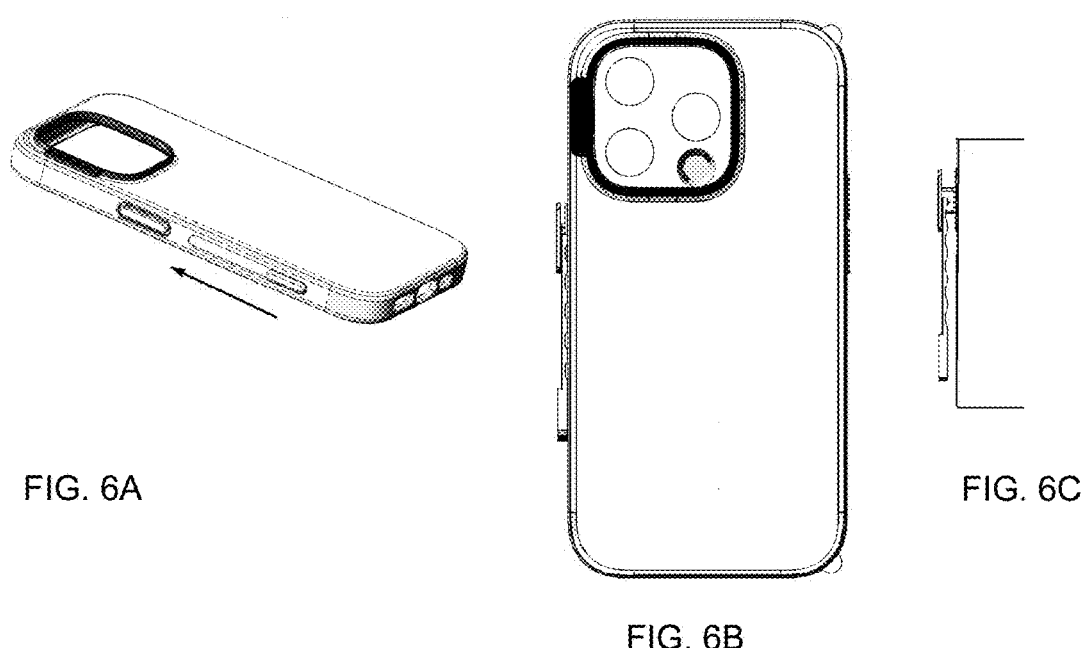
FIG. 6A
FIG. 6B
FIG. 6C
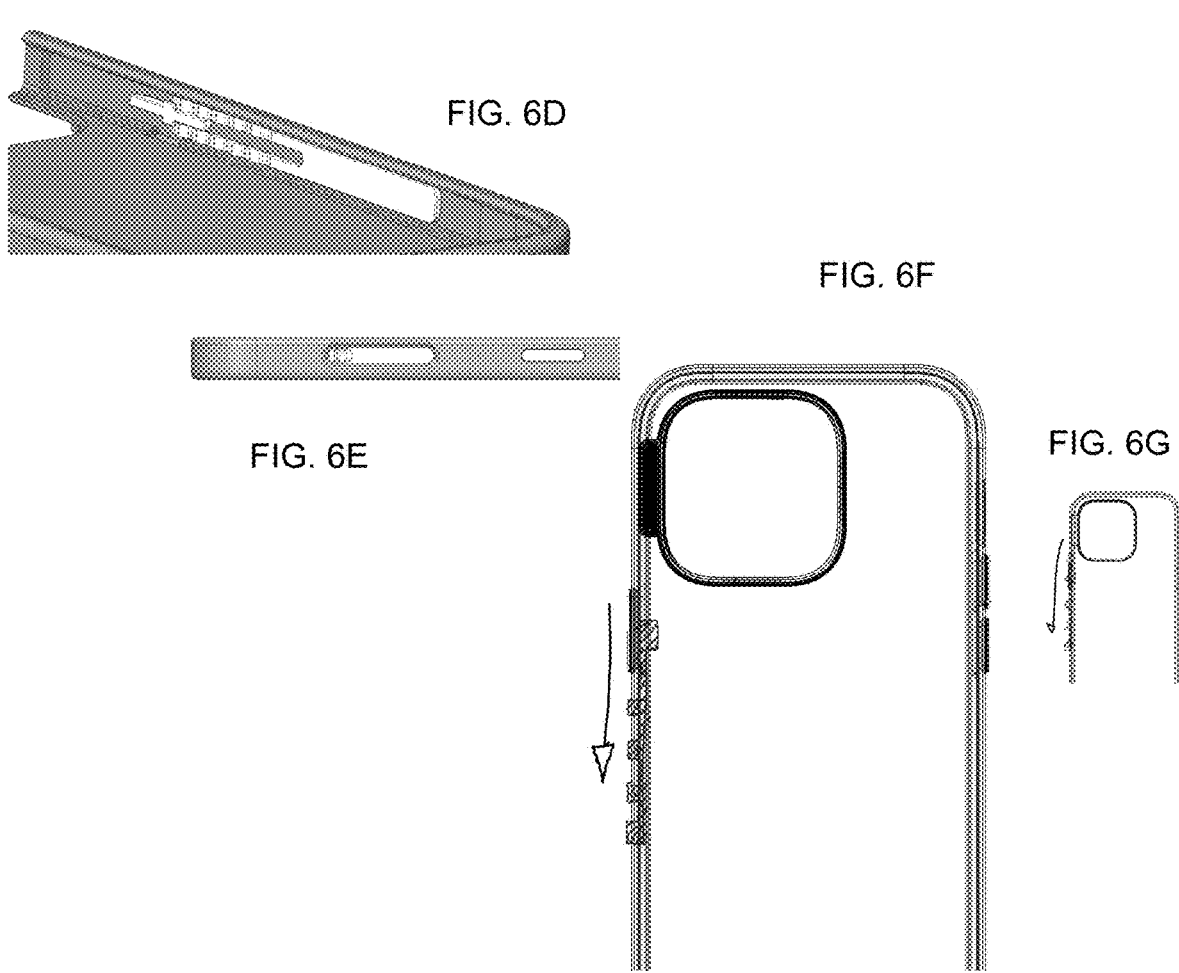
FIG. 6D
FIG. 6E
FIG. 6F
FIG. 6G

Viscous fluid

One-way valve

DRIVE MECHANISMS FOR ACTIVATING EMERGENCY FEATURES

This application claims the benefit of U.S. Provisional Application No. 63/105,145, filed on Oct. 23, 2020 and U.S. application Ser. No. 17/502,400, filed on 15 Oct. 2021, and incorporates them by reference.

BACKGROUND OF THE INVENTION

Field of the Invention

The present invention relates to an apparatus for activating emergency features of a mobile electronic device, and more particularly to a mobile device case or add-on assembly that is configured to facilitate easy activation of the emergency features of a mobile electronic device.

Discussion of Related Art

Mobile electronic devices are typically equipped with built-in emergency features that can be activated by the user upon activating physical buttons on the device, by pressing or touching the buttons, individually or in combination, in a particular sequence or for a threshold amount of time. This can be cumbersome for the user and can be difficult to execute in an emergency. Moreover, some users may have physical limitations preventing them from activating multiple buttons at the same time, activating one or more buttons multiple times in a row, or activating one or more buttons for a requisite period of time.

SUMMARY OF THE INVENTION

The disclosure relates to a case adapted to equip a mobile electronic device. In certain embodiments, the case comprises a case body configured to equip the mobile electronic device, wherein the case body comprises button-accessing means and wherein the mobile electronic device comprises one or more physical buttons. The case further comprises an actuator coupled to the case body, the actuator comprising a switch movable between at least a first position and a second position, and at least one engagement member configured to activate a physical button of the mobile electronic device when the device is equipped with the case and the switch is in or moved to the second position. Engagement members are configured to not activate corresponding physical buttons of the mobile electronic device when the switch is in or moved to the first position.

In certain embodiments, a button-accessing means comprises an aperture formed in the case body.

In certain embodiments, a button-accessing means comprises a flexible or semi-rigid button formed in the case body.

In certain embodiments, the actuator comprises a lever hingeably attached to the case body.

In certain embodiments, a first engagement member comprises a first tab formed on a first side of the actuator and a second engagement member comprises a second tab formed on a second side of the actuator, wherein the first side of the actuator is attached to a first side of the case body and the second side of the actuator is attached to a second side of the case body.

In certain embodiments, when the actuator switch is in the second position (i) the first tab in cooperation with one of the button-accessing means causes a corresponding first physical button of the mobile electronic device to be activated, and (ii) the second tab in cooperation with another of the two or more button-accessing means causes a corresponding second physical button of the mobile electronic device to be activated.

In certain embodiments, activating the first physical button and the second physical button at approximately the same time for a given period of time corresponds to an emergency activation feature of the mobile electronic device.

In certain embodiments, the physical buttons of the mobile electronic device are activated through one or a combination of pressure, touch, and conductivity rather than solely by being moved mechanically through a distance.

In certain embodiments, the actuator switch is movable between the at least first position and second position by a force applied by a user or by a mechanical-electrical assembly.

In certain embodiments, the actuator comprises a slide that slidably engages opposing sides of the case body.

In certain embodiments, the slide comprises an actuator switch, by which a user moves the actuator switch between the first and second positions.

In certain embodiments, a first engagement member comprises a first wing formed on a first side of the actuator and a second engagement member comprises a second wing formed on a second side of the actuator, wherein the first side of the actuator is attached to a first side of the case body and the second side of the actuator is attached to a second side of the case body.

In certain embodiments, when the actuator switch is in the second position (i) the first wing in cooperation with one of the two or more button-accessing means causes a corresponding first physical button of the mobile electronic device to be activated, and (ii) the second wing in cooperation with another of the accessing means causes a corresponding second physical button of the mobile electronic device to be activated.

In certain embodiments, the actuator activates a physical button on the electronic device a given number of times in a given period of time upon moving the actuator switch from a first position to a second position. For example, in one embodiment, the actuator comprises a gearing system that causes an engagement member to activate a physical button of the mobile electronic device five times over a given period of time whenever the actuator switch is moved from a first position to a second position. When the actuator switch is in or moved to the first position, the gearing system does not cause the engagement member to activate the corresponding physical button of the mobile electronic device. The switch might include a first end accessible to a user and a second end engaged with the gearing system. The switch might be a slideable member accessible to a user through an aperture in the case.

In certain embodiments, the gearing system includes a cam gear having a cam that rotates a desired number of times when the actuator switch is moved into the second position. The cam gear is attached to an armature such that the armature is configured to move an engagement member back and forth to activate the electronic device button the desired number of times whenever the actuator switch is moved into a second position.

In certain embodiments, an idler gear is included to prevent the engagement member from activating the corresponding electronic device button when the actuator switch is moved from the second position into the first position.

In some embodiments, the armature is configured to pull the engagement member toward the electronic device in order to activate a corresponding physical button on the electronic device. An engagement member spring may be provided to bias the engagement member away from the physical button of the electronic device.

In some embodiments, a delay between activations of a physical button of the mobile electronic device is useful. In some embodiments, a gear spring is employed in cooperation with a gearing system to increase the duration of time between button activations. For example, a central gear is attached to and biased by the gear spring (e.g. a spiral spring). The actuator switch may include a tab that extends to prevent the central gear from moving when the switch is in the first position and to allow the central gear to move when the switch is in the second position. The gearing system may be configured to move the central gear when the switch is moved to the second position.

BRIEF DESCRIPTION OF THE DRAWINGS

FIG. 4A is a back cutaway view of the mobile device case in an unengaged position. FIG. 4B is an exploded view of the case. FIG. 4C is a back cutaway view of the mobile device case in an engaged position. FIG. 4D is a front view of the case installed on a mobile electronic device in the unengaged position. FIG. 4E is a front view of the case installed on a mobile electronic device in the engaged position. FIG. 4F shows how a button on the mobile device is pressed.

FIGS. 5A-5E depict a third embodiment of a mobile device case configured to press a button on a mobile device a desired number of times in a chosen period of time. FIG. 5A is a back cutaway view of the mobile device casein an unengaged position. FIG. 5B is an exploded view of the case. FIG. 5C is a back cutaway view of the mobile device casein an unengaged position. FIG. 5D is a front view of the case installed on a mobile electronic device in the unengaged position. FIG. 5E is a front view of the case installed on a mobile electronic device in the engaged position.

FIGS. 6A-6G show a mobile device case having a side sliding actuator switch comprising an actuator arm having a series of ridges and valleys.

DETAILED DESCRIPTION OF THE INVENTION

According to one or more examples of the present disclosure, a mechanical or mechanical-electrical assembly for a mobile electronic device is configured to carry out an emergency feature activation, which comprises an activation of physical buttons on the device, either in a particular sequence or for a threshold amount of time. In certain embodiments, the assembly is actuated using a single point of user input that is converted into a multipoint input that corresponds to a mobile electronic device's emergency feature activation sequence.

It should be appreciated that the mechanical or mechanical-electrical assembly may be configured as a mobile electronic device case or may be an add-on assembly. In the case of a mechanical assembly, it should be appreciated that actuation of the assembly may be carried out by a user applying a manual force that causes one or more mechanical components of the assembly to move into a position that results in the activation of physical buttons of the mobile electronic device, where this activation corresponds to a sequence or duration needed to activate an emergency feature of the mobile electronic device.

Alternatively, in the case of a mechanical-electrical assembly, actuation of the assembly may be carried out by a user applying a designated manual force that activates an electrical circuit of the assembly which, in turn, is coupled to one or more mechanical components of the assembly that move into a position that results in physical buttons of the mobile electronic device being activated, where the buttons being activated correspond to a sequence and/or duration required for activation of an emergency feature of the mobile electronic device.

Finally, while the disclosure herein is presented with a focus on emergency feature activation, it should be equally appreciated that the disclosed invention is equally applicable in the context of any other mobile device feature that requires the activation of multiple buttons/switches or the activation of a single button for an extended period of time, e.g., powering on the device, performing a reset, taking a screenshot, etc.

Figure 1B:
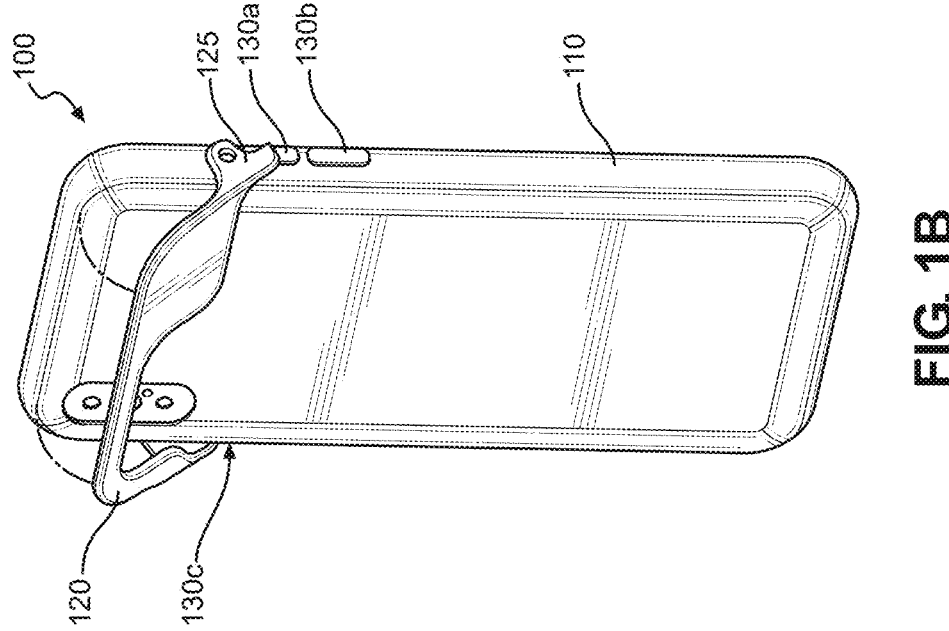
FIGS. 1A-1B depict different operating positions for a first embodiment of a mobile device case configured in accordance with the principles of the invention.
Figure 1A:
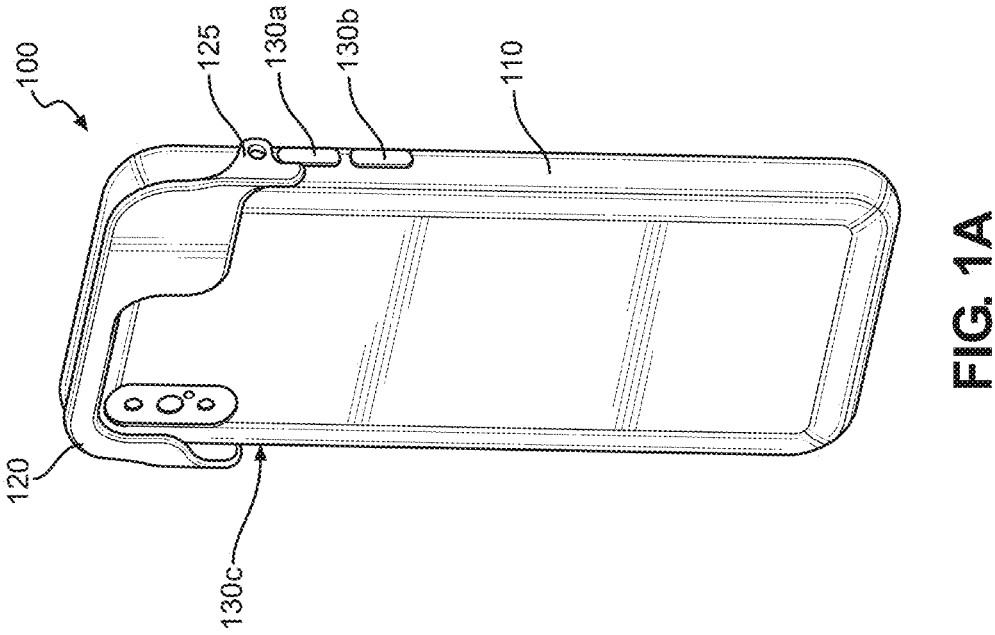

Referring now to FIGS. 1A-1B, depicted is a mobile electronic device equipped with a case 100 configured in accordance with the principles of the invention. The case 100 comprises a case body 110, an actuator in the form of a mechanical lever 120 attached on lateral sides of the case, as shown in FIGS. 1A-1B, and engagement members in the form of tabs 125 on either side of the case. Moreover, the case 100 for a mobile electronic device may be configured with button-accessing means (e.g., plurality of buttons/apertures 130*a*-130*c*) disposed on both or either side of the case 100. It should be appreciated that the case 100 may comprise more or fewer button-accessing means, or that buttons/apertures 130*a*-130*c* may be disposed in different locations along the case 100 so as to align with one or more corresponding physical buttons of the mobile electronic device on which the case 100 is equipped. The button-accessing means (e.g., buttons/apertures 130*a*-130*c*) may comprise a flexible or semi-rigid material, for example, that slightly protrudes from the case body 110 in order to cover and accommodate corresponding physical buttons of the mobile electronic device on which the case 100 is equipped. Alternatively, button-accessing means (e.g., buttons/apertures 130*a*-130*c*) may comprise apertures through which corresponding physical buttons of the mobile electronic device may protrude. Whether button-accessing means (e.g., buttons/apertures 130*a*-130*c*) comprise flexible or semi-rigid material that cover and accommodate corresponding buttons of a mobile electronic device, or whether button-accessing means (e.g., buttons/apertures 130*a*-130*c*) comprises apertures through which corresponding physical buttons of the mobile electronic device may protrude, it should be appreciated that case 100 is configured to provide access to one or more physical buttons of a mobile electronic device on which the case 100 is equipped. In particular, such access permits the one or more mobile device buttons to be actuated by an external mechanical force, as described in more detail below.

Continuing to refer to FIGS. 1A-1B, FIG. 1A depicts a first operating position of the actuator switch, e.g., lever 120, in which the lever 120 is in a vertical position and, as a result, the engagement members, e.g., tabs 125, are adjacent, but not in contact with buttons/apertures 130*a* and 130*c*, respectively. FIG. 1B depicts a second operating position of the lever 120 in which the lever 120 has now been moved from the vertical position to a skewed position and, as a result, tabs 125 are caused to move over the top of and thereby apply a mechanical force in the region defined by the buttons/apertures 130*a* and 130*c*, as shown. As a result, the corresponding physical buttons of the mobile electronic device may be activated. In this fashion, the user is able to provide a single, simple point of input (e.g. pushing the lever 120 down) that is converted by the assembly into a multi-point input (e.g., activating physical buttons of the mobile device corresponding to both buttons/apertures 130*a* and 130*c*). In certain embodiments, the multipoint input prefer-ably corresponds to a mobile electronic device's emergency feature activation sequence.

Moreover, it should be appreciated that case 100 may be configured to advantageously maintain the multipoint input without there being maintained user input for any extended period of time because the physical buttons of the mobile electronic device corresponding to the locations of the buttons/apertures 130*a* and 130*c* will continue to be depressed by tabs 125 even after the user stops making contact with the lever 120 (unless otherwise equipped with a spring or biased hinge, which may be preferable in certain embodiments). Finally, it should also be appreciated that a length of the tabs 125 may vary depending on mobile device button location, or if it is desirable to actuate additional mobile device buttons, such as a physical button of the mobile device corresponding to the lower button/aperture 130*b*.

Figures 2A, 2B:
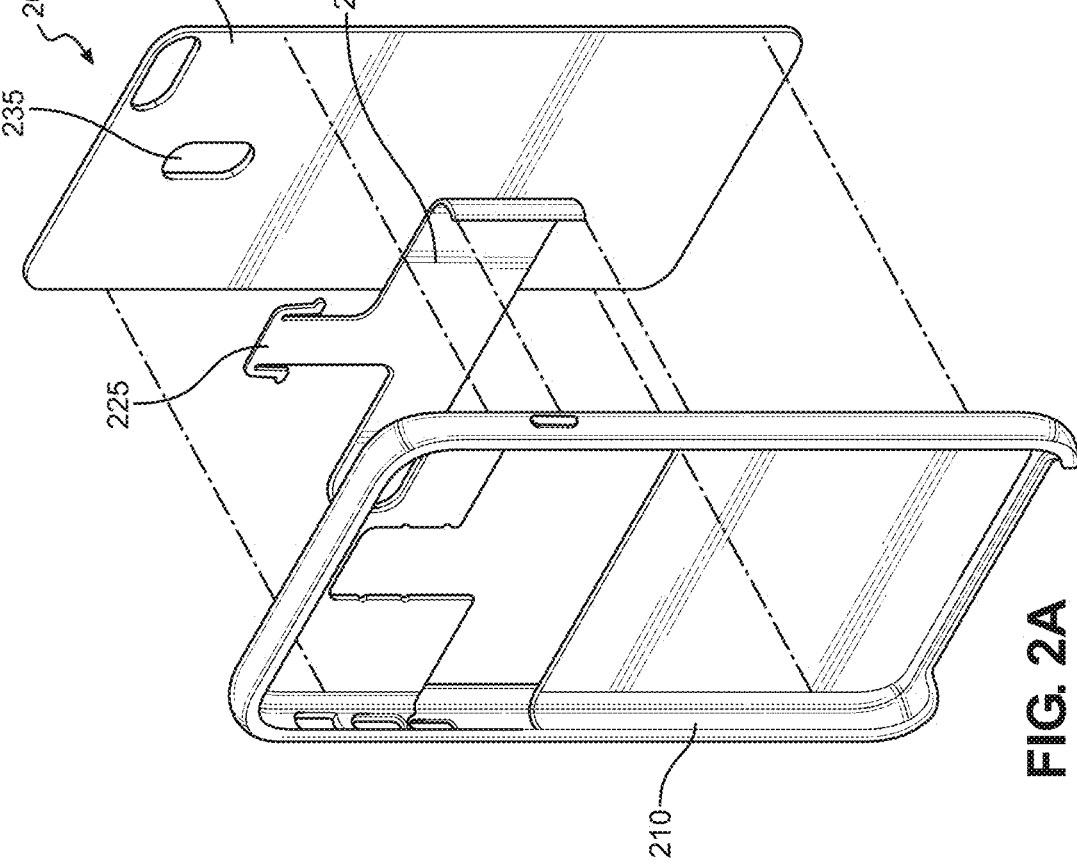
FIGS. 2A-2B depict a second embodiment of a mobile device case configured in accordance with the principles of the invention.

Referring now to FIGS. 2A-2B, depicted is a second embodiment of a mobile device case configured in accor-dance with the principles of the invention. Here, case 200 comprises a case body 210, an actuator in the form of a slideable member 220 and an optional back plate 230. The actuator, e.g., slide switch 220, is configured to engage the body 210, as shown in FIG. 2B, along interior side surfaces. Specifically, slide 220 comprises engagement members in the form of curved wing portions disposed on opposite sides that are configured to conform to and be slideably engaged with an inner (or outer) side surface of the body 210. Slide 220 further includes user control member 225 which is configured to serve as a point of user contact for actuating the slide 220, as further described with reference to FIG. 3 below. Optional back plate 230 may be used to provide rear protection for a mobile device and/or to secure the slide 220 to the body 210. When optional back plate 230 is used, it may be configured with access port 235 in order to provide user access to the user control member 225 for actuating the slide 220. [0028] As shown in FIGS. 2A-2B, case 200 may similarly be configured with one or more buttons/apertures (not labeled) that are substantially similar to buttons/aper-tures 130*a*-130*c* of FIGS. 1A-1B, and which may similarly correspond to locations of physical buttons of a mobile electronic device on which the case 200 is equipped.

Figure 3:
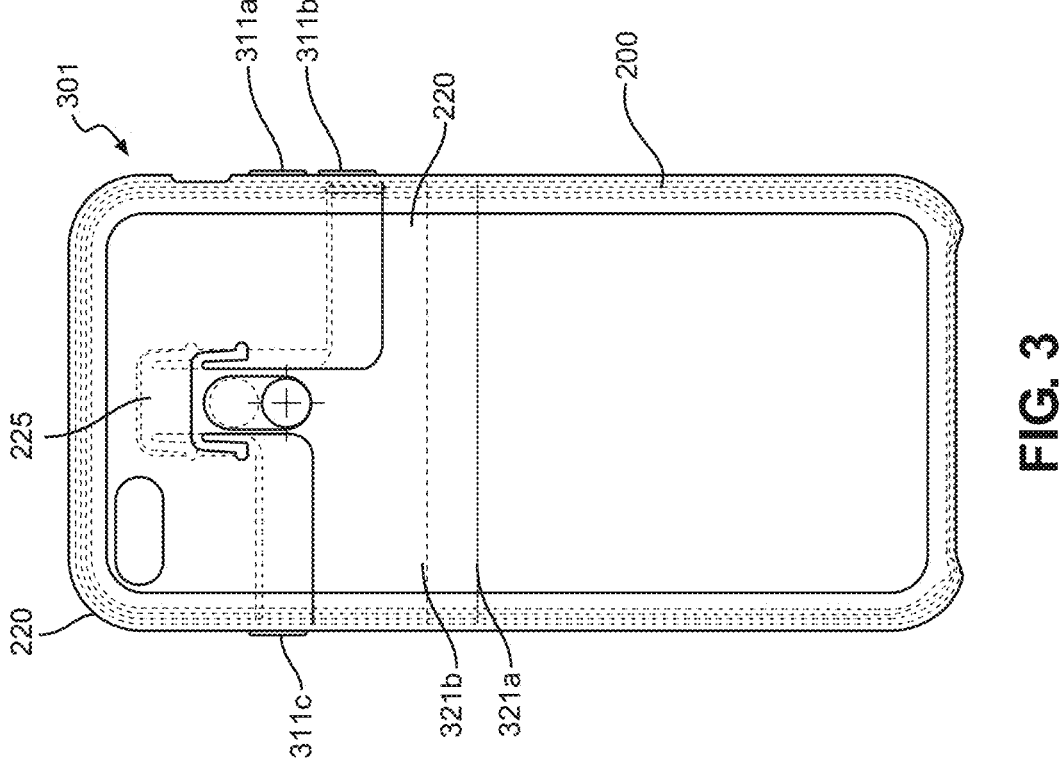
FIG. 3 depicts different operating positions for the second embodiment of FIGS. 2A-2B.

Referring now to FIG. 3, depicted is a mobile device 301 equipped with the case 200 of FIGS. 2A-2B, showing two different operating positions of the case 200. Specifically, in a first position 321*a*, the slide 220 is in a lower position such that its curved wing portions are situated below the physical buttons 311*a*-311*c* of the mobile device 301. As described above, case 200 is configured with one or more buttons/ apertures (not labeled), which are substantially similar to buttons/apertures 130*a*-130*c* of FIGS. 1A-1B, which are correspond to the locations of the physical buttons 311*a*-311*c* of the mobile device 301 when equipped thereon.

By virtue of the slide switch 220 being slideably engaged with an inner (or outer) side surface of the case 200, as described above, the slide 220 may be moved from the first position 321*a* to a second position 321*b* by, for example, a user contacting and sliding up the user control member 225. Since the second position 321*b* is higher than the first position 321*a*, the curved wing portions of the slide 220 will slide over the top of and thereby depress the physical buttons 311*b* and 311*c* of the mobile device, as shown, through corresponding buttons/apertures of the case 200, as described above. In this fashion, the user is able to provide a single, simple point of input (sliding the user control member 225 up) that is converted by the assembly into a multipoint input (e.g., activating both buttons 311*b* and 311*c*) where the multipoint input preferably corresponds to a mobile electronic device's emergency feature activation sequence.

Moreover, as with the first embodiment above, it should be appreciated that case 200 may be configured to advan-tageously maintain the multipoint input without maintained user input because buttons 311*b* and 311*c* will continue to be depressed by the wing portions of the slide 220 even after the user stops making contact with the user control member 225 (unless otherwise equipped with a biasing towards the first position 320*a*, which may be preferable in certain embodiments). Finally, while the winged portions of the slide 220 are configured to engage buttons 311*b* and 311*c* in this example, it should equally be appreciated that the winged portions may be configured to engage buttons 311*a* and 311*b*, but not 311*c*, in the second position 321*b*, or even to engage buttons 311*a* and 311*c*, and not 311*b*, by for example including a notch (not shown) through which button 311*b* is allowed to project and remain un-pressed when the slide 220 is in the second position 321*b*.

It should be appreciated that the above two embodiments are merely exemplary and that many other configurations are within the scope of this disclosure including, as noted above, mechanical-electrical assemblies, as well as numerous other mechanical-only assembles.

Figure 4A:
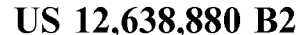
FIGS. 4A-4F depict a third embodiment of a mobile device case configured to press a button on a mobile device a desired number of times in a chosen period of time.
Figure 4B:
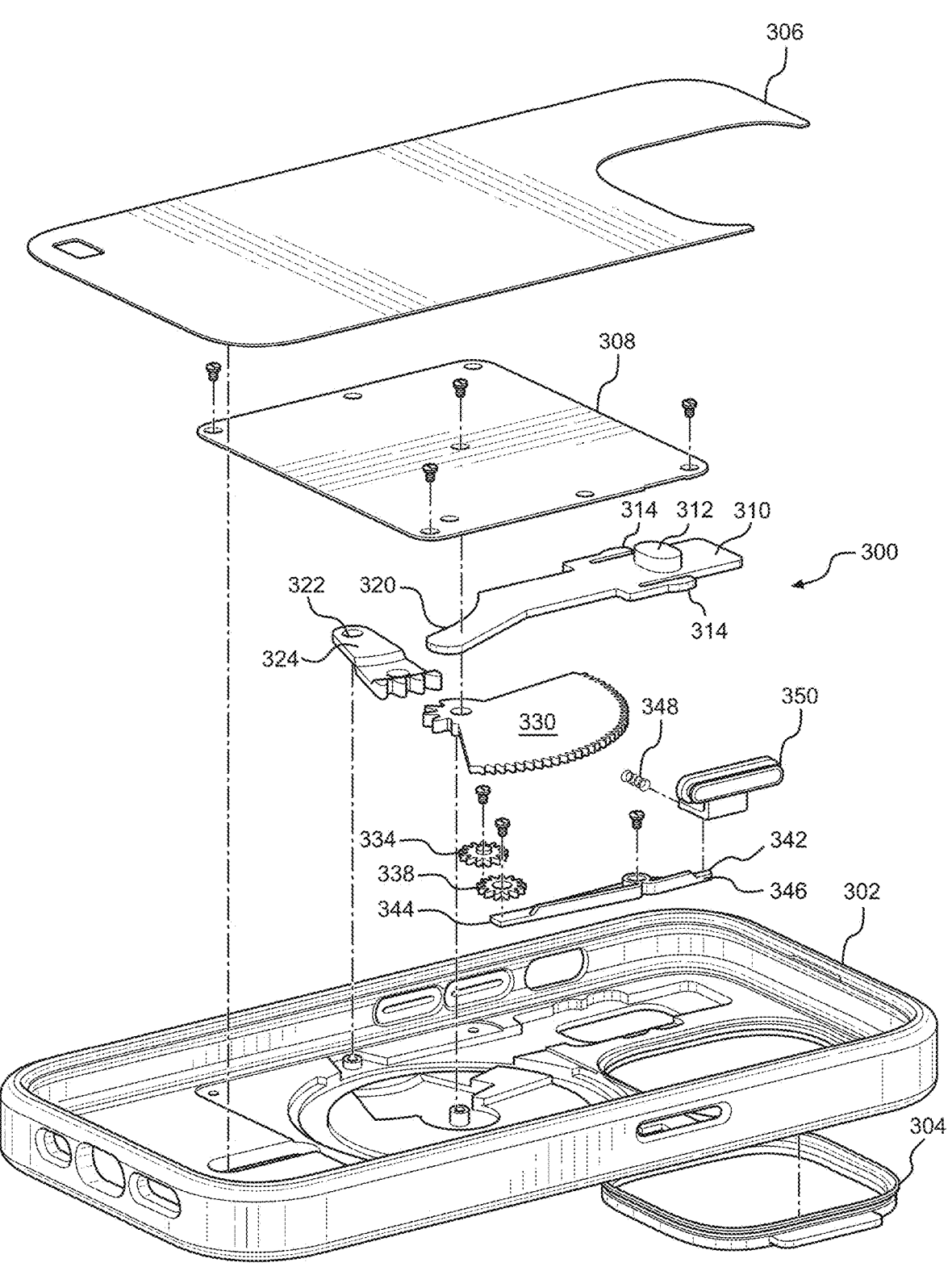
Figure 4C:
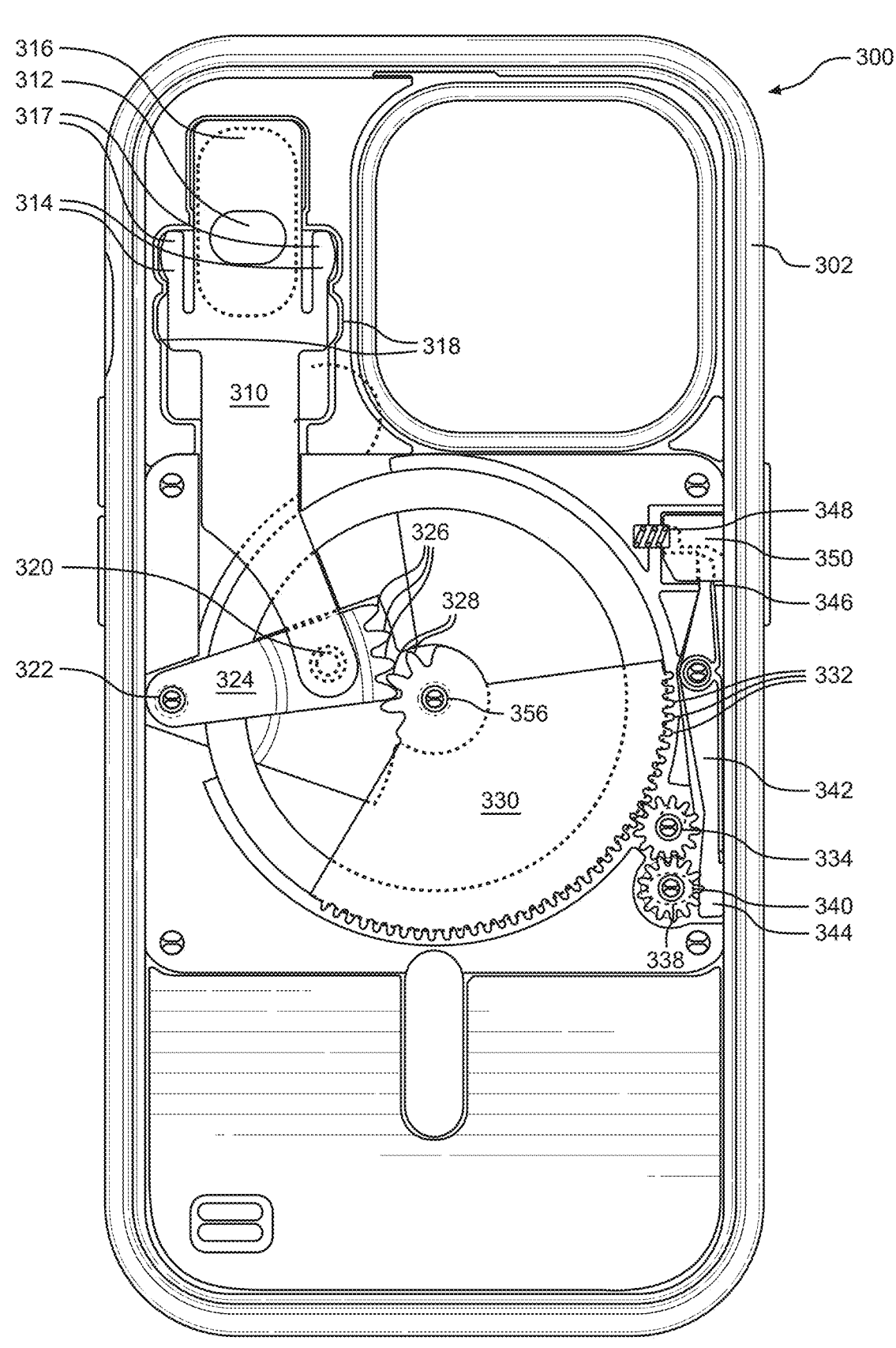
Figures 4D, 4E:
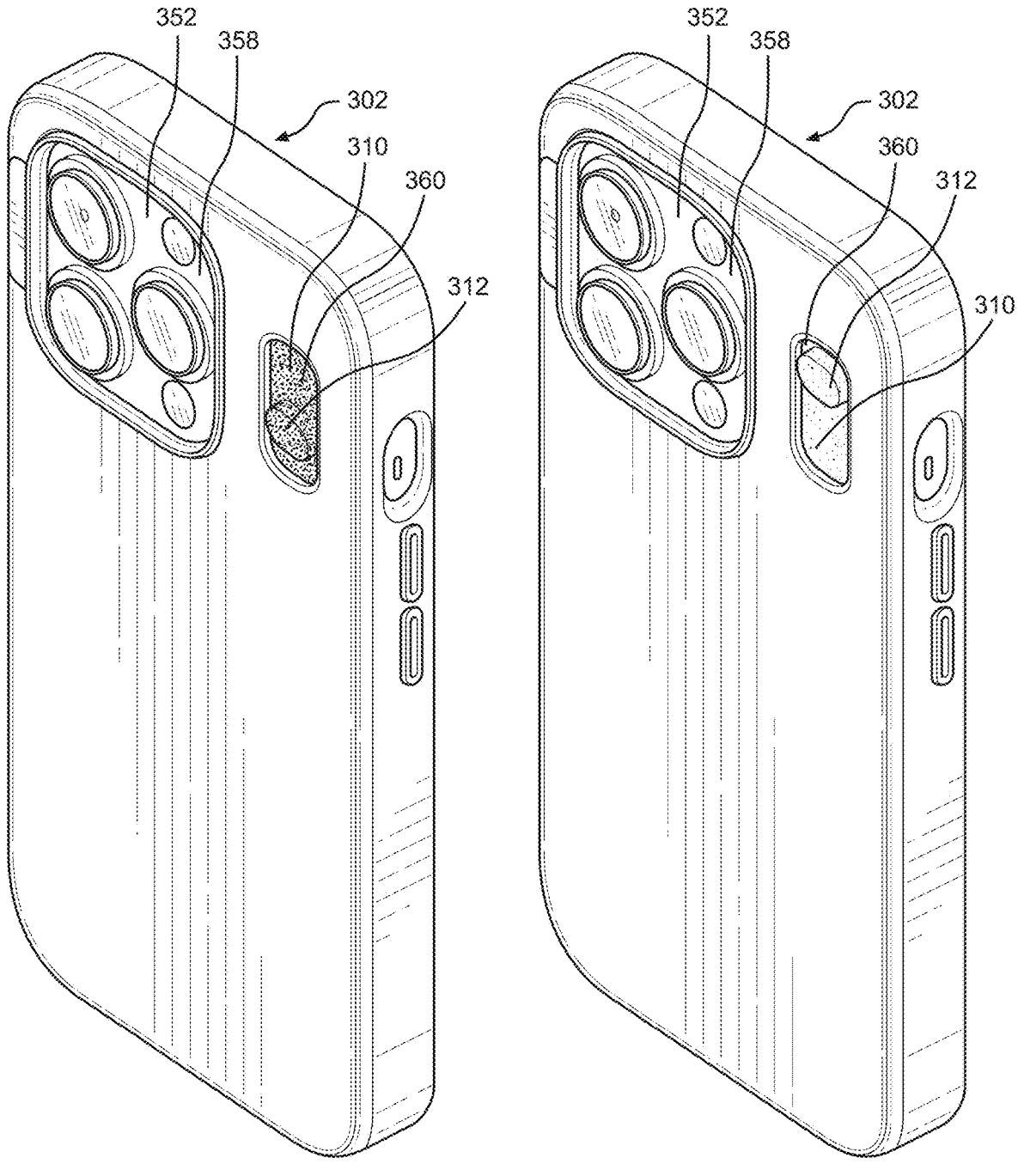
Figure 4F:
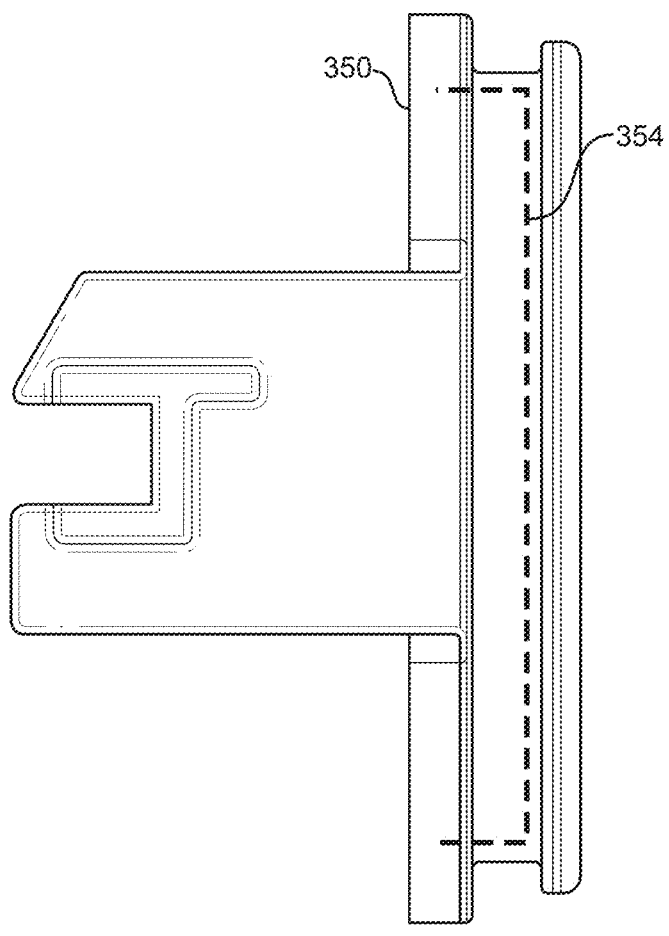

FIGS. 4A-4F depict a third embodiment of a mobile device case 300 configured to activate a button on a mobile device a desired number of times in a chosen period. In this embodiment, case 300 is based on an over-molded case assembly 302. FIG. 4A is a back cutaway view of mobile device case 300 in an unengaged position. FIG. 4B is an exploded view of case 300. FIG. 4C is a back cutaway view of mobile device case 300 in an engaged position. FIG. 4D is a front view of the case 300 installed on a mobile electronic device 352 in the unengaged position. FIG. 4E is a front view of the case installed on mobile electronic device 352 in the engaged position. FIG. 4F shows how a button 354 on the mobile device 352 is activated.

FIG. 4A is a back cutaway view of a mobile device case 300, shown in a first, unengaged, position. In this embodi-ment, a sliding actuator switch 310 is moved from a first, unengaged position (the lower position as shown in FIG.

4A) to a second, engaged position (as shown in FIG. 4C). When moved to an engaged position, switch 310 drives a gearing system, here a series of gears 324, 330, 334, 338. Cam gear 338 has a cam 340 that pushes armature lever 342 to pivot the lever, which then translates button device engagement member 350 inward, which depresses the device button 354 (see FIG. 4F). An idler gear 334 prevents armature 342 from pivoting when switch 310 is moved back to the unengaged position so that the device button is not pressed.

Some electronic devices require one of more buttons to be activated repeatedly within a short period in order to activate the device's emergency features. An advantage of embodiments such as case 300 and case 400 is that moving slide switch from the first position to the second position once can cause the device button 354 to be activated repeatedly. In the example embodiments 300, 400, moving the switch 310 to the second position causes the device button to be pressed five times.

In this embodiment, actuator switch 310 includes slide wings 314 which are used to hold the switch in its chosen position. Switch 310 is configured to fit into slide recess 316, and slide wings 314 fit into slide recess 316 lower notches 318 in the unengaged position and into upper notches 317 in the engaged position. Slide switch 310 includes a button 312 which is accessible to the user in order to slide switch 310 between positions (see FIGS. 4D and 4E).

The actuator gearing system in this example operates as follows: Switch 310 is moved upwards, pulling lever gear 324 upward at attachment point 320 so that it pivots about lever gear pivot point 322. This rotates central gear 330 clockwise via lever gear teeth 326 engaging with central gear inner teeth 328. Central gear outer teeth 332 engage with idler gear 334 teeth, which in turn engages cam gear 338 cam 340.

Cam gear 338 includes a cam 340 which presses armature 342 gear end 344 to the side when cam 340 is turned sideways. Armature 342 thus pivots armature 342 engagement member end 346 to pull engagement member 350 inward, causing it to press the electronic device 352 button 354. Because of the gearing, cam gear 338 rotates multiple times as switch 310 is engaged. In this example, cam 340 causes armature 342 to rock five times so the electronic device button is pressed five times as switch 310 is moved. Engagement member spring 348 biases engagement member 350 away from the device button 354, so that it can be pressed repeatedly and so that engagement member 350 does not press the electronic device button 354 except when the user slides switch 310 to the engaged position.

When switch 310 is moved back to the first, unengaged, position the user likely does not want the electronic device button 354 to be activated. Central gear 330 rotating counterclockwise causes idler gear 334 to move into its idler position so that it does not engage cam gear 338. Cam gear 338 thus does not turn, so cam 340 does not move armature 342.

FIG. 4B is an exploded isometric view of case 300. Case 300 is based on an over-molded case assembly 302 which houses switch 310, gearing system 324, 330, 334, 338, armature 342, engagement member 350, and gear spring 348. This particular embodiment further includes a trim ring 304, a liner 306, and a cover plate 308 to hold the above parts in place as shown.

Molded case assembly 302 includes recesses and openings as shown. For example, opening 360 allows access for the user to slide switch 310 up and down via button 312. Opening 358 is provided to, for example, allow cameras on the electronic device to operate. Other openings allow for things like electronic device buttons, speakers, on/off switches and power access.

Recesses are provided for switch 310, pivot gear 324, central gear 330, cam gear 338, idler gear 334, armature 342, and engagement member 350 with its engagement member spring 348. The central recess includes a protrusion to limit the movement of central gear 330.

FIGS. 5A-5E depict a fourth embodiment of a mobile device case 400 configured to press a button 354 on a mobile device 352 a desired number of times in a chosen period of time. This embodiment is very similar to the one shown in FIGS. 4A-4F and similar reference numbers are used where appropriate, and similar elements are not described again in detail.

Figure 5A:
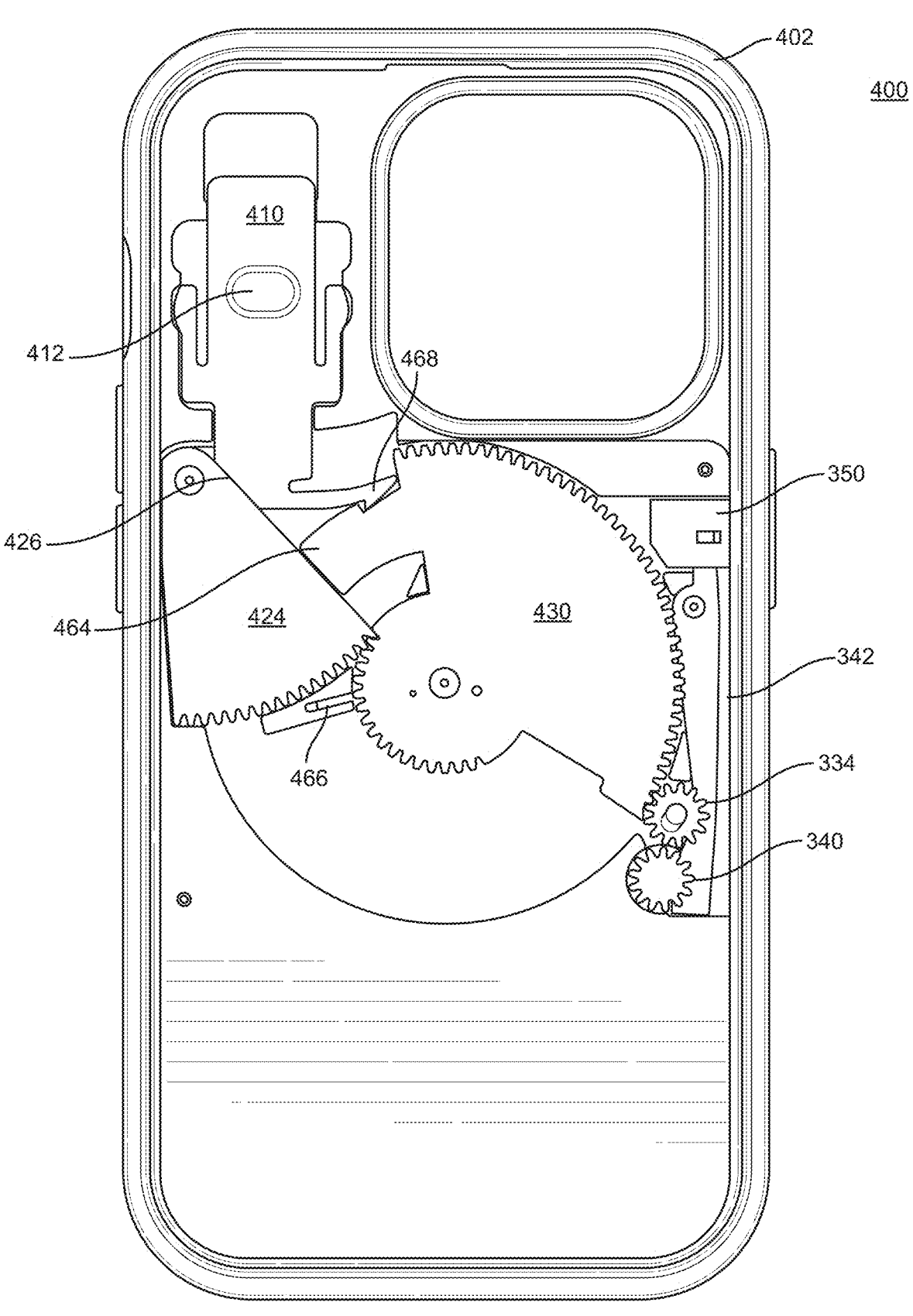
Figure 5B:
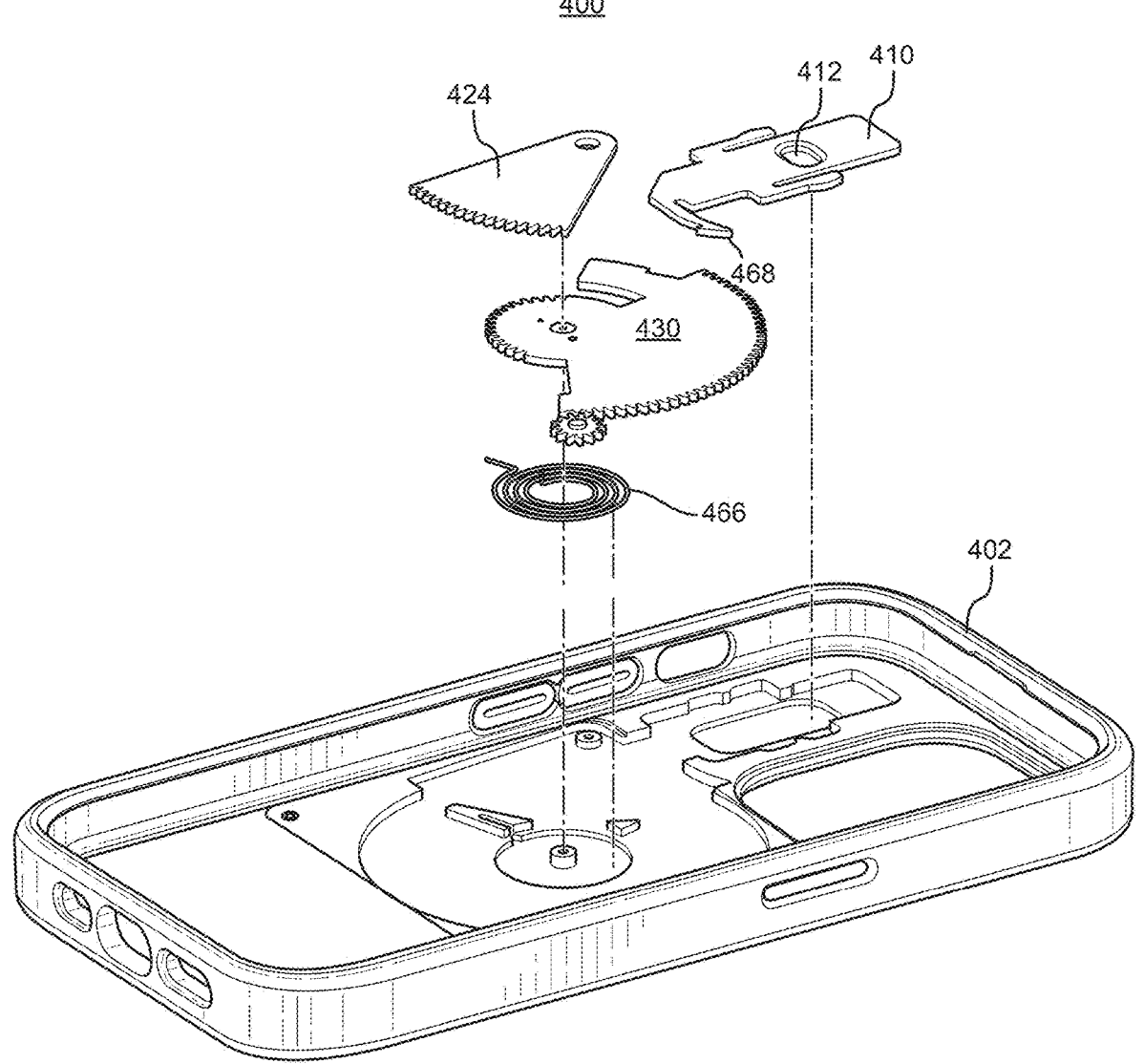
Figure 5C:

FIG. 5A is a back cutaway view of the mobile device case 400 in the unengaged position. FIG. 5B is an exploded view of case 400. FIG. 5C is a back cutaway view of mobile device case 300 in the engaged position. FIG. 5D is a front view of the case 300 installed on a mobile electronic device 352 in the unengaged position. FIG. 5E is a front view of the case installed on mobile electronic device 352 in the engaged position.

Case 400 includes a system for spacing out the timing between repeated device button 354 presses. In the embodiment of FIGS. 5A-5E, when switch 410 is moved upward into the engaged position, spiral spring 466 rotates central gear 430 at a desired speed to space out the device button 354 engagement over time as desired. Slide switch 410 includes an optional protrusion 468 which acts to prevent central gear 430 from rotating when switch 410 is in the unengaged position as shown in FIG. 5A. Protrusion 464 on central gear 430 is also optional. When switch 410 is moved to the engaged position, as in FIG. 5C, protrusion 468 retreats upward, and central gear 430 is biased into rotating by spiral spring 466. When switch 410 is engaged, central gear 430 also moves fan gear 424 upward to be in position for moving back to the unengaged position.

As described with respect to embodiment 300, upon engagement, central gear 430 engages with idler gear 334 to engage cam 340 to move armature 342, which pulls engagement member 350 inward to repeatedly press device 352 button 354. For more details on this process refer back to the description of embodiment 300. Similarly, when switch 410 is move to the unengaged position, idler gear 334 does not engage cam gear 338 so that device button 354 is not pressed upon disengagement.

Returning to FIGS. 5A-C, when switch 410 is moved to the unengaged position (downward as in FIG. 5A) a pressing surface 426 pushes fan gear 424 downward. This causes central gear 430 to return to the unengaged position against the biasing of central spring 466. Thus, central gear 430 is ready to be biased into its engaged position again when desired.

In FIG. 5B, only the new elements case 402, switch 410, fan gear 424, central gear 430, and spiral spring 466 are shown for clarity. Refer back to FIG. 4B for more detail.

FIG. 5D shows case 402 with switch 410 in the unengaged position. A user pushes button 412 upward to move switch 410 upward into the engaged position as shown in FIG. 5E.

FIGS. 6A-8 show various embodiments of mobile devices having ridges and valleys used to repeatedly activate a device button. In these embodiments, the actuator comprises an actuator switch connected to, and in some cases integrally formed with, an actuator arm comprising a series of ridges and valleys. When the actuator switch is moved from a first to a second position, the ridges and valleys activate a physical button on the mobile electronic device a number of times corresponding to the number of ridges and valleys. The ridges might make direct contact with a physical button of the mobile electronics device as the actuator arm slides by the button, or they might engage a further component (or components) of the actuator that makes contact with the physical button of the mobile electronics device.

FIGS. 6A-6G show a mobile device case having a side sliding actuator switch comprising an actuator arm comprising a series of ridges and valleys. The ridges are engagement members that activate a physical button on the electronic device as the actuator arm slides past the button. The ridges and valley may comprise various shapes. FIG. 6A is an isometric view. FIG. 6B is a back view. FIG. 6C is a back cutaway view. FIG. 6D is an isometric view from inside the case. FIG. 6E is a side view. FIG. 6F is a back cutaway view. FIG. 6G is a back cutaway view where the ridges and valleys have a different shape. In this example, the device button is activated five times.

Figure 7A:
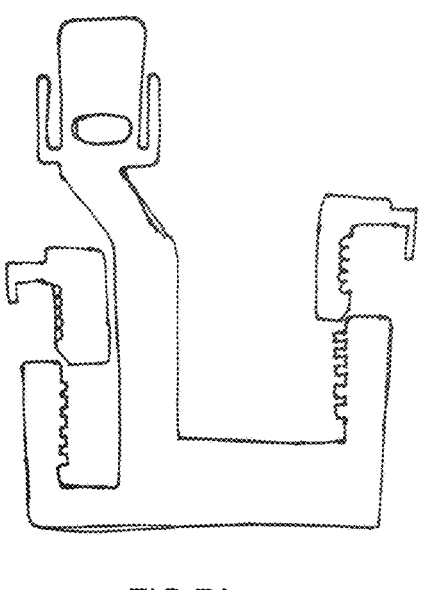
FIGS. 7A-7D show two embodiments of a mobile electronic device case having a back sliding switch with ridges and valleys communicating with an engagement member with corresponding ridges and valleys.
Figure 7B:
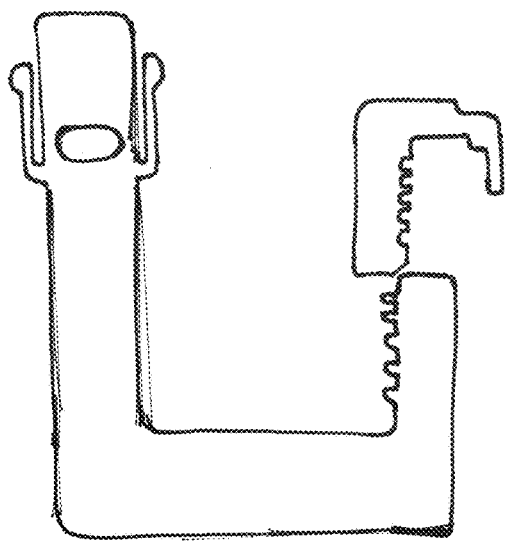
Figure 7C:
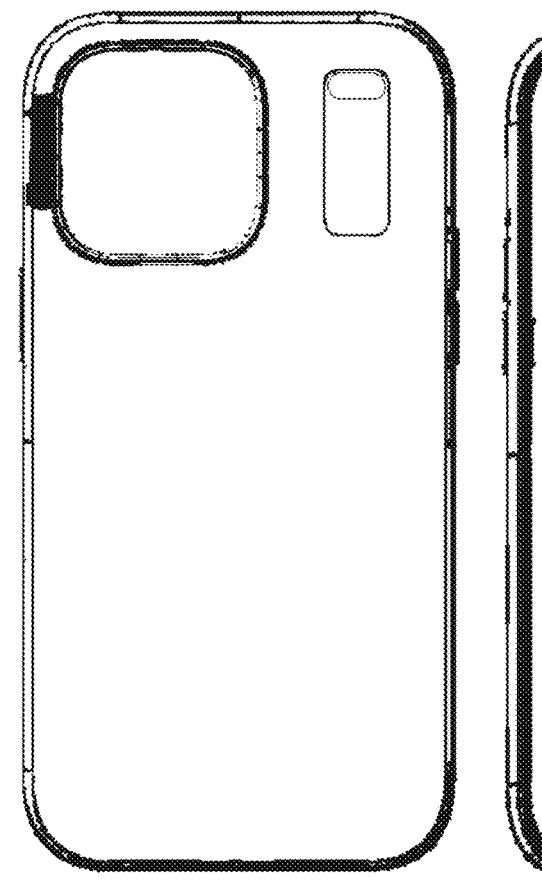
Figure 7D:
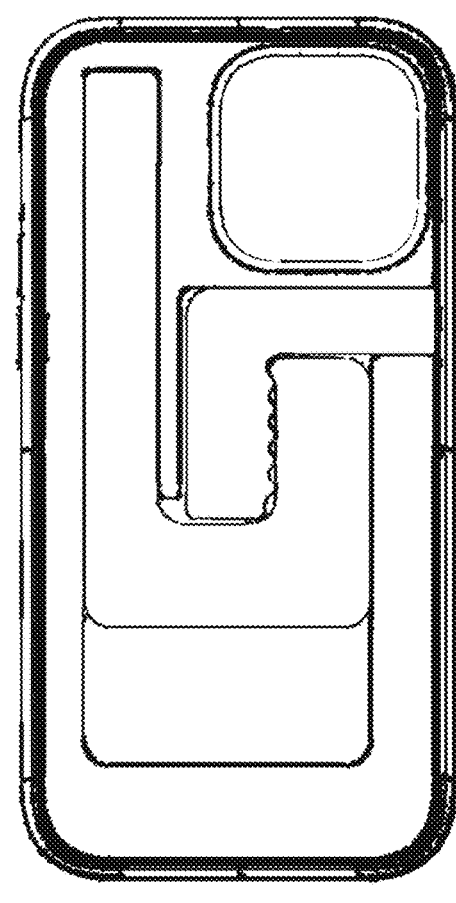
Figure 8:
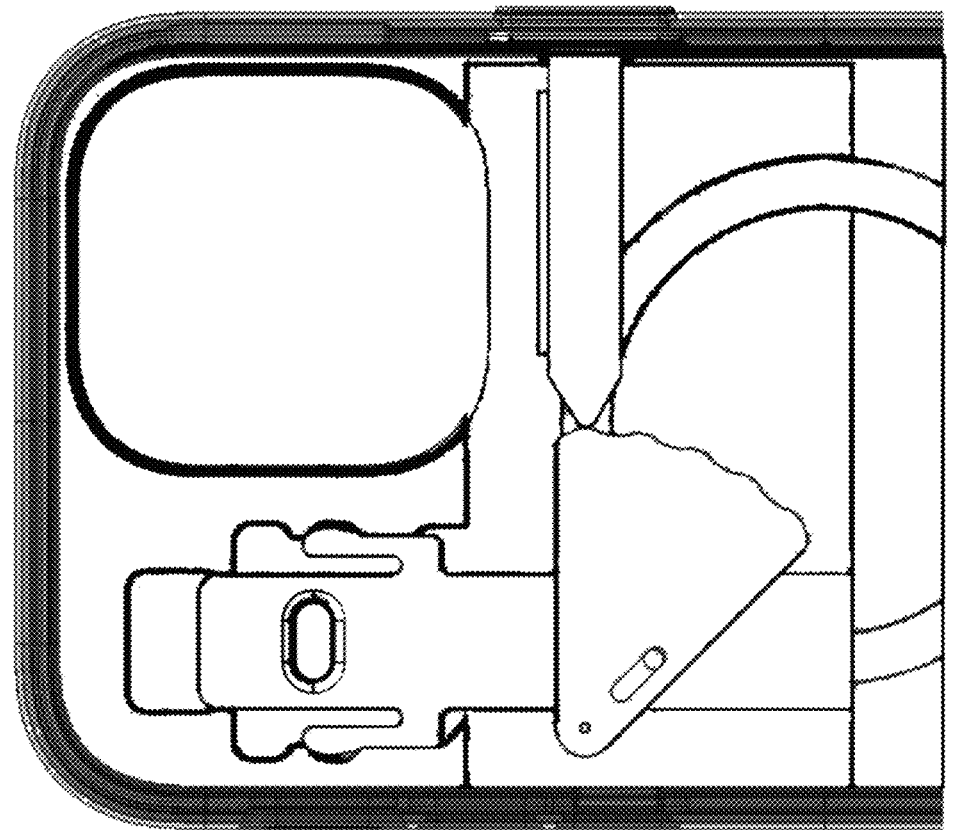
FIG. 8A shows a mobile electronic device case having a ridged side wheel.
FIG. 8B shows a mobile electronic device case having a back sliding switch with ridges and valleys communicating with a fan gear with corresponding ridges and valleys.

FIGS. 7A-7D show two embodiments of a mobile electronic device case having a back sliding switch with ridges and valleys communicating with an engagement member with corresponding ridges and valleys. In FIGS. 7A and 7D there are two separate sections where the actuator switch engages with the engagement member. FIG. 7C shows the switch on the back of the case.

FIG. 8A shows a mobile electronic device case having a ridged side wheel wherein the ridges are engagement members that activate a physical button on the electronic device as the side wheel turns. In this embodiment, the actuator comprises an actuator wheel connected to the device case, comprising a series of gear teeth. When the actuator wheel is rotated, the gear teeth activate a physical button on the mobile electronic device a number of times corresponding to the amount of rotation of the wheel. The gear teeth might make direct contact with a physical button of the mobile electronics device or they might engage a further component (or components) of the actuator that makes contact with the physical button of the mobile electronics device.

FIG. 8B shows a mobile electronic device case having a back sliding switch connected to a fan gear with ridges and valleys that communicate with an engagement member. This is a cam and follower embodiment.

Figure 9A:
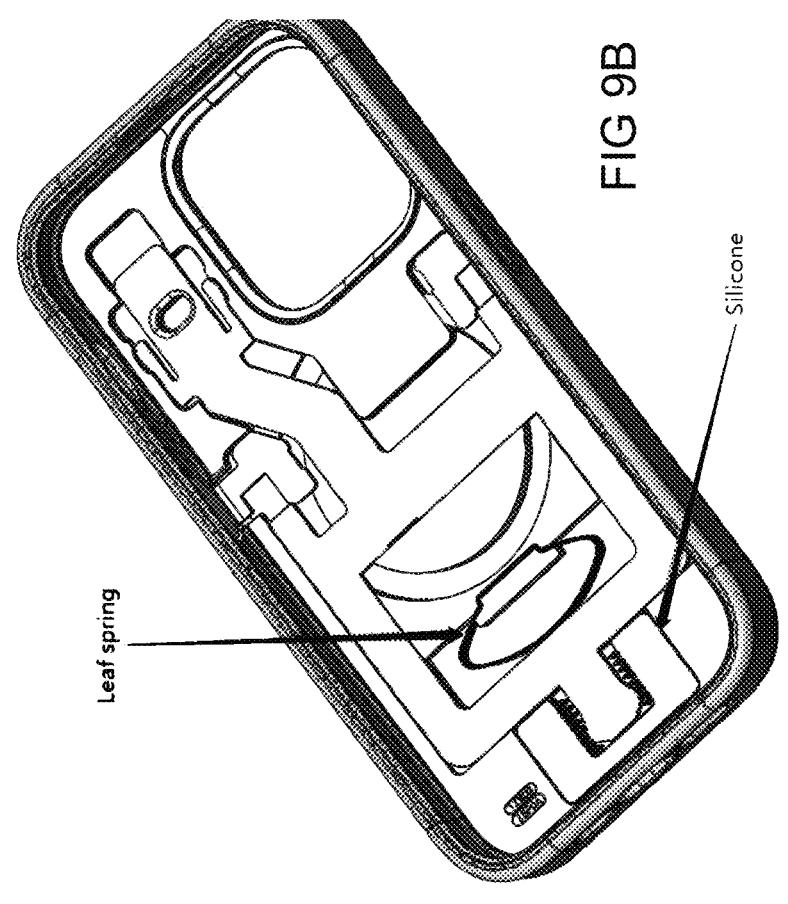
FIGS. 9A and 9B show two embodiments of a mobile electronic device case having hold and release spring mechanisms.
Figure 9B:
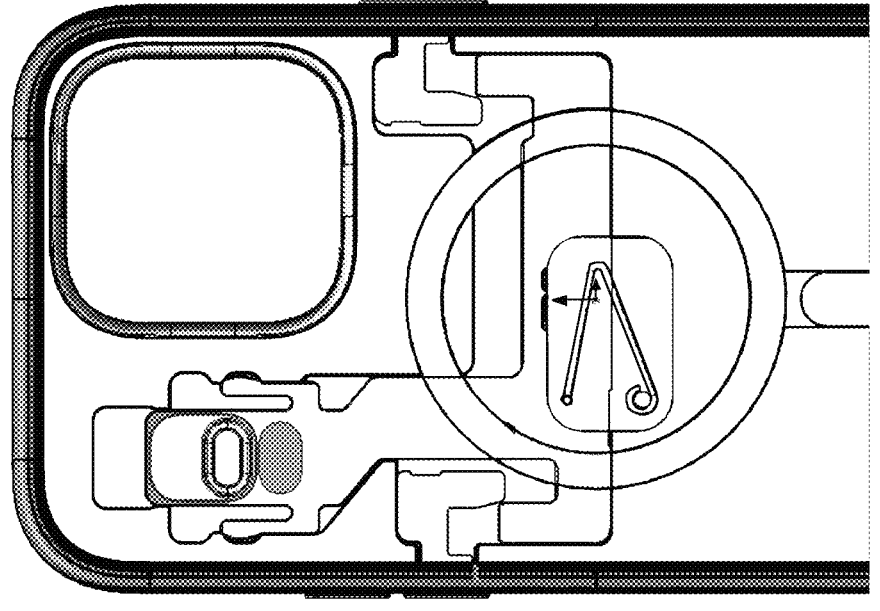

FIGS. 9A and 9B show two embodiments of a mobile electronic device case having hold and release spring mechanisms. Using the example of an iPhone, the "hold and release" action involves pressing and holding device buttons until the SOS slider appears on the screen. Once the SOS slider appears, the user slides the SOS slider to make an emergency call. This action activates the emergency SOS feature on the iPhone, allowing a to quickly call emergency services and alert your emergency contacts.

In this embodiment, the actuator could be a two-position switch as previously described. When the actuator is moved to the second position to depress the physical buttons on the device, a spring biases against the movement from first to second position. This spring will eventually return the actuator back to its first position but not immediately in order to allow sufficient time to pass for the SOS slider to appear on the screen.

FIG. 9A shows a hold and release spring mechanism for activating a physical button on a mobile electronic device and then releasing it within a time frame. When the user activates the actuator switch, the spring mechanism causes a button on the electronic device to be activated for a given limited period.

FIG. 9B has a leaf spring and a damping element, here silicone teeth, for activating a button and then releasing it within a time frame. When the user activates the switch and then releases it, the leaf spring will make the slide move down as the silicone teeth help to control its speed. The damping component could be an elastomeric material with small fingers, to assist in the delay of the actuator from second to first position, or various other damping devices and materials.

Figure 10:
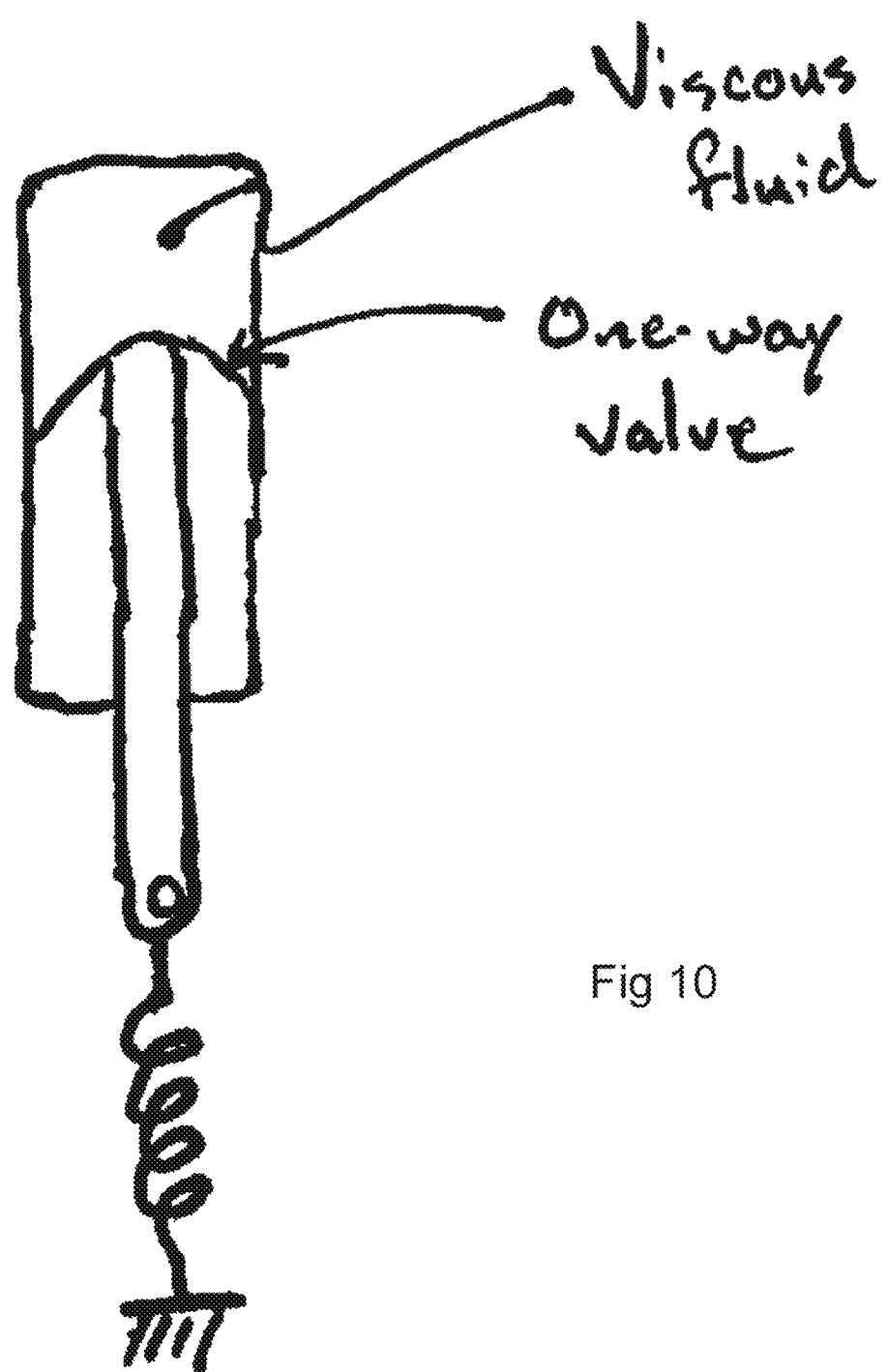
FIG. 10 shows an example of a delay device.

FIG. 10 shows an example of a delay device. In this embodiment, the damping component, which could be a piston with a viscous fluid (or sand) and one way valve, would entail activation which pushes the flexible valve forward through viscous fluid in a piston (dampener.) The spring pulls the switch slowly backward through fluid and therefore delays the actuator movement from second to first position.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of various embodiments. This description should be read to include one or at least one and the singular also includes the plural unless it is obvious that it is meant otherwise.

It will be appreciated that elements in the FIGs are illustrated for simplicity and clarity and have not necessarily been drawn to scale. For example, the dimensions and/or relative positioning of some of the elements in the FIGs may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts.

Further, while several examples have been disclosed herein, any features from any examples may be combined with or replaced by other features from other examples.

Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The term switch includes any device configured to move between two or more positions, including levers, sliders, rocker switches, dials, etc. Terms such as up, down, right, left, etc. are used for convenience in describing the FIGs Those skilled in the art will appreciate that various positions, locations and configurations will fall within the spirit of the invention.

While the exemplary preferred embodiments of the present invention are described herein with particularity, those skilled in the art will appreciate various changes, additions, and applications other than those specifically mentioned, which are within the spirit of this invention. For example, many different gearing systems can accomplish pressing a device button multiple times within a period, and various elements such as other springs, springers, flywheels, etc., may be used to increase the period between button activations. The device button may be located in other positions, as may the switch. Multiple buttons may be activated at the same rate or different rates. Periods between presses may vary. The spiral spring may be wound by a user or with a self-winding mechanism.

What is claimed is:

1. A case configured to equip a mobile electronic device comprising:

a case body configured to equip the mobile electronic device, wherein the case body comprises an engagement member configured to press a physical button on the mobile electronic device;

an actuator switch coupled to the case body and movable between at least a first position and a second position; and a gearing system connected to the actuator switch;

wherein the gearing system, in cooperation with the engagement member, depresses the physical button of the mobile electronic device a desired number of times in a chosen period of time when the mobile electronic device is equipped with the case and the actuator switch is moved into the second position, and wherein the gearing system does not cause the engagement member to depress the physical button of the mobile electronic device when the actuator switch is moved into the first position.

2. The case of claim 1, wherein the actuator switch comprises a slideable member accessible to a user through an aperture in the case.

3. The case of claim 1 wherein the actuator switch includes a first end accessible to a user and a second end engaged with the gearing system.

4. The case of claim 1 wherein the gearing system is configured to move the engagement member the desired number of times in the chosen period when the actuator switch is moved into the second position once.

5. The case of claim 1 wherein the gearing system includes a cam gear having a cam that rotates a desired number of times when the actuator switch is moved into the second position.

6. The case of claim 5 further comprising an armature wherein the cam gear is engaged with the armature such that the armature is configured to move the engagement member back and forth when the actuator switch is moved in order to activate the physical button of the electronic device the desired number of times.

7. The case of claim 6, further comprising an idler gear configured to prevent the engagement member from pressing the physical button of the electronic device when the actuator switch is moved from the second position into the first position.

8. The case of claim 6 wherein the armature is configured to pull the engagement member toward the electronic device, and where the engagement member is configured to press the physical button of the electronic device.

9. The case of claim 8, further comprising an engagement member spring configured to bias the engagement member away from the physical button of the electronic device.

10. The case of claim 1, further comprising a gear spring in communication with the gearing system, the gear spring configured to increase a duration of time between button presses.

11. The case of claim 10 further comprising a central gear attached to and biased by the gear spring, and wherein the actuator switch includes a tab configured to prevent the central gear from moving when the actuator switch is in the first position and to allow the central gear to move when the actuator switch is in the second position.

12. The case of claim 11 wherein the gear spring is a spiral spring.

13. The case of claim 11 wherein the gearing system is configured to move the central gear when the actuator switch is moved to the first position.

14. The case of claim 11 wherein the gearing system includes a cam gear having a cam that rotates a desired number of times when the actuator switch is moved into the second position and wherein rotation of the cam causes the engagement member to press the physical button of the electronic device.

15. The case of claim 14, further comprising an idler gear configured to engage with the cam gear when the actuator switch is moved to the second position and to disengage with the cam gear when the actuator switch is moved to the second position and wherein disengagement of the cam gear prevents the engagement member from pressing the physical button of the electronic device.

16. A case configured to equip a mobile electronic device comprising: a case body configured to equip the mobile electronic device; an engagement member configured to press a physical button on the mobile electronic device; an actuator switch coupled to the case body and movable between at least a first position and a second position; and wherein the engagement member depresses the physical button of the mobile electronic device a desired number of times in a chosen period of time when the mobile electronic device is equipped with the case and the actuator switch is moved into the second position, and wherein the engagement member does not depress the physical button of the mobile electronic device when the actuator switch is moved into the first position.

17. The case of claim 16 further comprising a gearing system configured to move the engagement member the desired number of times in the chosen period when the actuator switch is moved into the second position once.

18. The case of claim 17 wherein the gearing system includes a cam gear having a cam that rotates a desired number of times when the actuator switch is moved into the second position.

19. The case of claim 18 further comprising an armature wherein the cam gear is engaged with the armature such that the armature is configured to move the engagement member back and forth when the actuator switch is moved in order to activate the physical button of the electronic device the 5 desired number of times.

20. The case of claim 19, further comprising an idler gear configured to prevent the engagement member from pressing the physical button of the electronic device when the actuator switch is moved from the second position into the 10 first position.

\* \* \* \* \*